Dec. 8, 1959   N. MAZUR ET AL   2,916,297
METHODS AND APPARATUS FOR SHIPPING BUSES
HAVING AIR SUSPENSION SYSTEMS
Filed Aug. 21, 1957
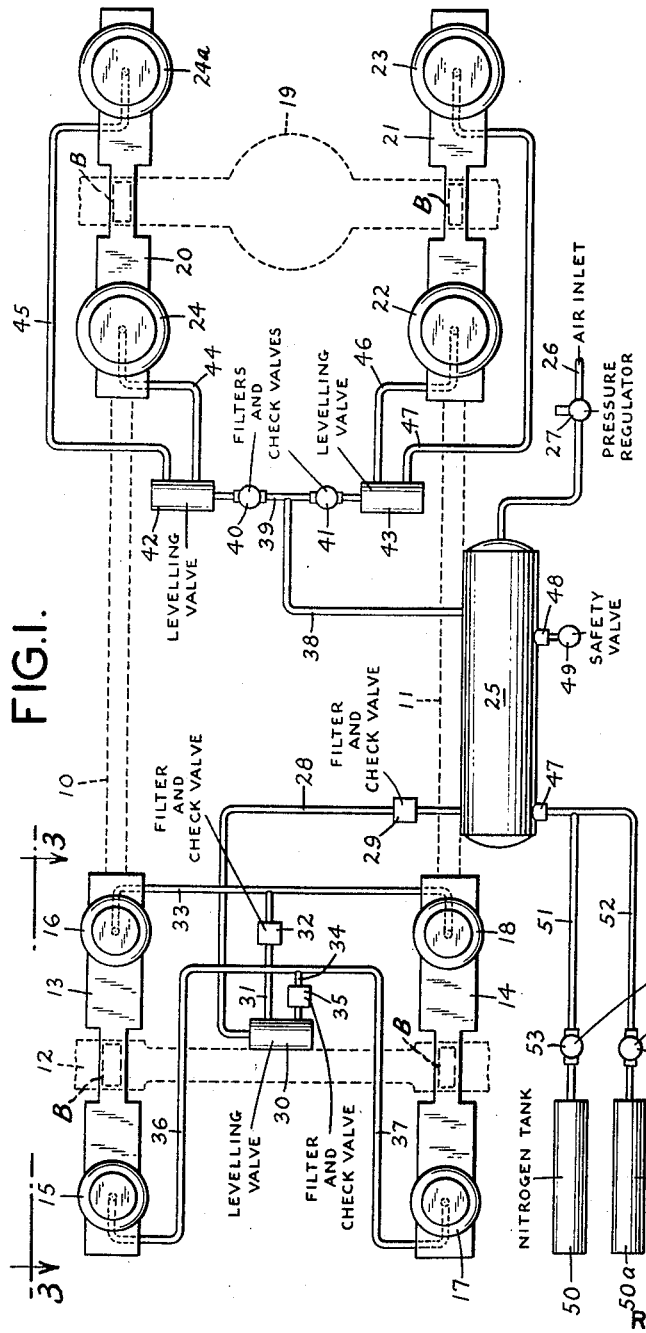
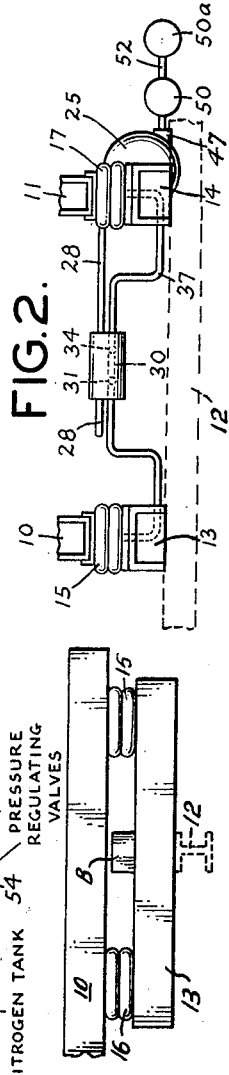
INVENTORS,
NICHOLAS MAZUR
RICHARD R. HASKEY
HIS ATTORNEYS United States Patent Office 2,916,297
Patented Dec. 8, 1959

2,916,297

METHODS AND APPARATUS FOR SHIPPING BUSES HAVING AIR SUSPENSION SYSTEMS

Nicholas Mazur, Shenandoah, and Richard R. Haskey, Emmaus, Pa., assignors to Mack Trucks, Inc., Plainfield, N.J., a corporation of New York Application August 21, 1957, Serial No. 679,344

8 Claims. (Cl. 280—124)

This invention relates to methods and apparatus for conditioning or preparing vehicles for transportation by rail, ship or the like, and it relates particularly to a method and apparatus for preparing vehicles such as trucks, buses and the like having air spring suspensions to enable them to be shipped by rail, trailer or ship without damage to the vehicles.

Air suspensions currently used in trucks, buses and in some passenger vehicles, include air springs, such as, inflatable bellows or air cylinders interposed between the chassis or body of the vehicle and the axle or the wheel suspension linkage of such vehicles. Air under pressure is supplied to the air springs from an air reservoir or tank which is supplied with compressed air by means of a pump driven by the engine of the vehicle or a motor driven by the electrical system of the vehicle. Usually the suspensions include air leveling valves for regulating the pressure of air supplied to each air spring or group of air springs in order to compensate for unequal or different loadings of the vehicle and to maintain riding comfort under different road conditions.

Inasmuch as leakage of air from the suspension system is almost unavoidable, difficulty has been encountered in shipping vehicles having air suspension systems on railway cars and ships due to the fact that loss of air pressure from the air springs causes the vehicle to tilt and jam against adjacent vehicles or cargo, thereby damaging them. Moreover, deflation of the air springs frequently damages the air springs themselves thereby requiring replacement before the vehicle can be put into service.

Numerous expedients have been suggested to avoid the above-mentioned difficulties. For example, rigid chocks or jacks have been placed between the axles or the wheel suspension linkage and the vehicle body or chassis. While such chocks prevent settling of the vehicle and damage to the air springs, they frequently rack or twist the frame of the vehicle inasmuch as the chocks place twisting strains on the body or the chassis when the air springs are deflated.

It has also been proposed to use turnbuckles and links or cables to anchor the body firmly to the bed of the railway car or deck of the ship but such arrangements cannot prevent canting of the vehicle body if one or more of the air springs becomes deflated.

The present invention provides a system and method of conditioning or preparing vehicles for transportation in which all of the disadvantages noted above are completely overcome.

In accordance with the present invention, after suitable preparation of the components of the air suspension system, tanks of compressed gas, such as nitrogen, are connected to the air suspension system and means are provided for regulating the pressure supplied by the tanks so that the gas supplied by the tanks maintains adequate pressure for inflating the air springs over long periods of time despite normal leakage of air or gas from the system. In this way, the air springs cannot collapse or be damaged and the vehicle body or chassis cannot cant or settle relative to the deck or platform on which it is mounted.

For a better understanding of the present invention reference may be had to the accompanying drawings in which:

Figure 1 is a schematic plan view of a typical air suspension system for a vehicle such as a bus or truck modified to include the elements for shipping or transporting the vehicle;

Figure 2 is a schematic front elevational view of the system; and

Figure 3 is a view in section taken on line 3—3 of Figure 1.

A great many different types of air suspensions have been provided heretofore which are susceptible to conditioning in accordance with the present invention in order to place the vehicle in condition for transportation by ship or rail.

Figures 1 to 3 show schematically and by way of example an air suspension system generally of the type disclosed in the Fox et al. U.S. Patent No. 2,691,420, dated October 12, 1954. The chassis of the vehicle is shown as including a pair of longitudinally extending frame members 10 and 11 which may be suitably formed of box girders, channel irons or I-beams on which the body of the vehicle is mounted. The frame is usually provided with a number of stiffening cross members (not shown) inasmuch as they are conventional and may vary widely in their position and construction. Disposed beneath the front end of the frame and carrying the dirigible or steering wheels of the vehicle is an axle which may be rigid or, if desired, an independent form of wheel suspension. For purposes of illustration, the axle 12 is shown as a rigid member on which are mounted the usual king pins, wheel spindles etc., for supporting the dirigible wheels. A pair of beams 13 and 14 fixed to the front axle 12 engage and support the collapsible and expansible bellows 15, 16, 17 and 18. The longitudinal frame members 10 and 11 rest on the upper ends of the bellows and are supported thereby. Each of the bellows 15 to 18 includes a pair of flexible hollow generally doughnut shaped bellow sections communicating with each other and formed of rubber reinforced with plies of a fabric which renders them essentially air-tight and resistant to puncturing.

At the opposite end of the vehicle frame is the rear axle 19 which is supported by a pair of beams 20 and 21 having bellows 22, 23, 24, and 24a interposed between the beams and the longitudinal frame members 10 and 11 or other components of the vehicle chassis or body. In the illustrative form of the invention, the vehicle is provided with an air tank or reservoir 25 to which air is supplied under pressure through an air inlet line 26 connected to an air compressor driven by the engine of the vehicle or by means of an independently operated motor, for example, an electric motor supplied with power from the electrical system of the vehicle. An air pressure regulator 27 is interposed in the air inlet line 26 to regulate the pressure in the air reservoir or tank 25.

Air is supplied from the tank 25 through an air line 28 having a filter and check valve 29 therein for cleaning the air and preventing reverse flow of air into the tank 25. A leveling valve 30 of conventional type for regulating the air pressures in the bellows 15 to 18 is connected to the air line 28. An air line 31 provided with a filter 32 and check valve is connected to the leveling valve 30 and to a line 33 which has its opposite ends in communication with the bellows 16 and 18. A similar air line 34 having a filter and check valve 35 therein is connected to the leveling valve 30 and by means of the air lines 36 and 37 to the bellows 15 and 17. An air line 38 supplies air from the air tank 25 to an air line 39 having check valves and air filters 40 and 41 therein, the opposite ends of the air line 39 being connected to leveling valves 42 and 43. Air from the leveling valve 42 is supplied by the air lines 44 and 45 to the bellows 24 and 25. The leveling valve 43 supplies air to the bellows 22, 23 by means of the air lines 46 and 47.

With the system described, sufficient air pressure is maintained in each of the bellows of the air suspension to support the vehicle body and the load carried by the vehicle and maintain the proper spring action as well as hold the vehicle body level.

It will be understood that bumper blocks are interposed between the axles and the frames to absorb shock when the axles bottom due to extremely heavy load conditions or operation over rough roads or terrain.

A system of the type embodying the present invention will now be described as applied to the air spring suspension described above. Inasmuch as the pump for supplying air to the tank or reservoir 25 is inactivated during transportation or shipping of the vehicle, another source of gas under pressure is provided to keep the bellows inflated and thereby prevent damage to them or unwanted settling of the vehicle during shipment.

In conditioning the vehicle for transportation, for example, on a railway flat car, the bumper blocks are removed from between the axles and the frames and are replaced with spacers B of a rigid type formed of wood, metal or the like. The spacers B do not prevent relative movement between the axles and the vehicle body or chassis. Having placed the spacers in position, the air is released from the system so that the air pressure in the system is reduced to about atmospheric and the vehicle settles on the spacers.

Two plugs which normally close the couplings 47 and 48 in the air tank 25 are removed and the plug in the coupling 48 is replaced by a safety valve to relieve pressure in the tank if it should exceed a predetermined maximum. One or more tanks 50 and 50a of compressed gas under high pressure, such as compressed nitrogen, are secured to the floor of the railway car and are connected by means of the conduits 51 and 52 to the coupling 47. Nitrogen is preferred because of its inertness and absence of fire hazard but other gases may also be used. The conduits 51 and 52 have pressure regulating valves 53 and 54 therein by means of which the pressure of the gas supplied to the tank 25 can be regulated. The compressed gas tanks are fixed to the car platform by straps or other anchoring means to prevent them from shifting in transit. Depending upon the pressure required in the system for inflating the air springs to lift the vehicle body from the spacers B, the pressure regulating valves 53 and 54 are then set for the appropriate pressure above atmospheric pressure and the safety valve 49 is also set for an appropriate blow-off pressure. The blow-off pressure may be as high or higher than 65 lbs. per square inch or a much lower value depending upon the pressure required for the vehicle being transported.

When the system has more than one air reservoir, a safety valve is connected to each of the reservoirs in order to maintain substantially uniform and reasonable pressures in the system. With the tanks of compressed gas connected to the air reservoir 25 or air reservoirs, the valves on the tanks are opened and the gas flows through the regulating valves 53 and 54 into the air tank 25 and into the bellows to inflate them and keep them inflated during shipping of the vehicles.

It will be understood that the wheels of the vehicle can be chocked or otherwise secured to the bed or platform of the railway car or the ship deck to prevent shifting of the vehicle during transportation.

In the systems in which the air pressure is varied by means of a level control arm on the leveling valve as disclosed in the Fox et al. Patent No. 2,691,420, the level control arm can be locked in an open position to maintain equal pressures in all of the bellows corresponding to the pressure of the gas supplied to the reservoir from the tanks 50 and 50a.

It will be understood that other types of air suspensions than the suspension described above can be conditioned for shipment in a similar way and that the tanks of compressed gas can be attached to such air suspension systems at any place or places where appropriate couplings are provided and which will enable all of the air springs or bellows to be inflated. Accordingly, it will be understood that the air suspension described and disclosed herein is illustrative of only one of many systems with which the present invention can be used and the following claims should not be considered as limited to such an exemplary system.

We claim:

1. A method of conditioning for shipment a vehicle having an air suspension system including air springs and at least one air reservoir for supplying air under pressure to said springs, comprising introducing into the vehicle substantially rigid spacers to prevent collapse of said air springs when they are deflated and connecting at least one tank of high pressure compressed gas to said system and regulating the pressure of the gas supplied to the air reservoir to a lower value to maintain the air springs inflated.

2. A method of conditioning for shipment on a railway car, ship and the like a vehicle having an air suspension system including air springs and at least one air reservoir connected to asid springs to supply air under pressure thereto for inflating said springs, comprising mounting the vehicle on a platform, reducing the air pressure in said air springs and said reservoir to about atmospheric pressure, connecting a tank of high pressure gas to said air suspension system, and admitting to said air suspension system gas from said tank at a pressure lower than the gas pressure in said tank and above atmospheric pressure to inflate said air springs.

3. The method set forth in claim 2 comprising securing said vehicle and said gas tank against movement relative to said platform.

4. The method set forth in claim 2 in which said compressed gas is nitrogen.

5. The method set forth in claim 2 comprising supporting the vehicle while reducing the air pressure in said system to prevent complete collapse of said air springs.

6. A system for shipping a vehicle having an air suspension including air springs and an air reservoir for supplying air under pressure to said air springs comprising a platform for supporting said vehicle, substantially rigid means on said vehicle for supporting it with said air springs only partially collapsed when they are deflated, at least one tank of highly compressed gas fixed relative to said platform, and means connecting said tank to said air suspension system to supply gas thereto for inflating said air springs.

7. The system set forth in claim 6 comprising a pressure regulating valve interposed in said connecting means to regulate the pressure in said air springs to a value lower than the pressure in said tank and sufficient to inflate the air springs.

8. The system set forth in claim 7 comprising a pressure responsive relief valve connected with said air springs and reservoir to limit the gas pressure in said air suspension system.

References Cited in the file of this patent

UNITED STATES PATENTS

| Re. 16,295 | Down | Mar. 23, 1926 |
| 2,427,927 | Schutte | Sept. 23, 1947 |